(12) United States Patent
Stöcker et al.

(10) Patent No.: US 10,764,362 B2
(45) Date of Patent: Sep. 1, 2020

(54) SYSTEM AND METHOD FOR TRANSPORTING AN OBJECT

(71) Applicants: Carsten Stöcker, Hilden (DE); Jürgen Waffner, Essen (DE)

(72) Inventors: Carsten Stöcker, Hilden (DE); Jürgen Waffner, Essen (DE)

(73) Assignee: innogy Innovation GmbH, Essen (DE)

( * ) Notice: Subject to any disclaimer, the term of this patent is extended or adjusted under 35 U.S.C. 154(b) by 147 days.

(21) Appl. No.: 15/969,184

(22) Filed: May 2, 2018

(65) Prior Publication Data
US 2018/0255131 A1    Sep. 6, 2018

Related U.S. Application Data

(63) Continuation of application No. PCT/EP2015/076098, filed on Nov. 9, 2015.

(51) Int. Cl.
*H04L 12/00* (2006.01)
*H04L 29/08* (2006.01)
(Continued)

(52) U.S. Cl.
CPC ......... *H04L 67/104* (2013.01); *G06Q 10/083* (2013.01); *G06Q 50/28* (2013.01); *G06Q 50/30* (2013.01); *H04L 9/0838* (2013.01)

(58) Field of Classification Search
CPC ...... G06Q 10/083; G06Q 50/30; G06Q 50/28; H04L 67/104; H04L 9/0838
(Continued)

(56) References Cited

U.S. PATENT DOCUMENTS

| 6,848,108 B1 * | 1/2005 | Caron | G06F 9/546 |
| | | | 719/314 |
| 7,509,400 B1 * | 3/2009 | Tanner | G06F 13/387 |
| | | | 370/352 |

(Continued)

OTHER PUBLICATIONS

Zhang Yu et al., "An IoT Electric Business Model Based on the Protocol of Bitcoin", 2015 18th International Conference on Intelligence in Next Generation Networks, IEEE, Feb. 17, 2015, pp. 184-191.

(Continued)

*Primary Examiner* — Frantz Coby
(74) *Attorney, Agent, or Firm* — Reinhart Boerner Van Deuren P.C.

(57) ABSTRACT

Embodiments of a system that includes at least one transport broker entity is provided. The transport broker entity is configured to provide at least one mobile transport unit that is configured to transport at least one object. The transport broker entity includes a first peer-to-peer module configured to communicate with at least a first peer-to-peer application of a first peer-to-peer network. The transport broker entity also includes a first entity having a peer-to-peer module configured to communicate with at least the first peer-to-peer application of the first peer-to-peer network. At least upon a triggering by the first peer-to-peer module of the transport broker entity and/or the peer-to-peer module of the first entity, the first peer-to-peer application is configured to generate an object transport agreement about the physical transport of the object between the first entity and a further entity at least partly by means of the mobile transport unit.

15 Claims, 6 Drawing Sheets

(51) Int. Cl.
*G06Q 50/30* (2012.01)
*G06Q 10/08* (2012.01)
*G06Q 50/28* (2012.01)
*H04L 9/08* (2006.01)

(58) Field of Classification Search
USPC .................. 709/205, 213, 220, 223, 249
See application file for complete search history.

(56) References Cited

U.S. PATENT DOCUMENTS

| | | | | |
|---|---|---|---|---|
| 7,533,172 | B2* | 5/2009 | Traversat | G06F 9/4416 709/223 |
| 7,586,921 | B2* | 9/2009 | Heuer | H04J 3/1611 370/395.51 |
| 7,631,317 | B2* | 12/2009 | Caron | G06F 9/546 719/313 |
| 7,958,249 | B2* | 6/2011 | Sherman | G06F 16/10 709/229 |
| 9,154,900 | B1* | 10/2015 | Addepalli | H04L 45/12 |
| 2003/0117954 | A1* | 6/2003 | De Neve | H04L 47/808 370/230 |
| 2003/0212782 | A1* | 11/2003 | Canali | H04L 41/5009 709/223 |
| 2009/0222517 | A1* | 9/2009 | Kalofonos | G06Q 10/10 709/204 |
| 2010/0265890 | A1* | 10/2010 | Giese | H04L 29/06 370/328 |
| 2015/0269570 | A1 | 9/2015 | Phan et al. | |
| 2016/0269341 | A1* | 9/2016 | Kumar | H04L 51/24 |

OTHER PUBLICATIONS

Reid Williams, "How Bitcoin Tech Could Make Supply Chains More Transparent", internet article http://www.coindesk.com/how-bitcoins-technology-could-make-supply-chains-more-transparent/, May 31, 2015.

Sanjay Panikkar, "ADEPT: An IoT Practitioner Perspective Draft Copy for Advance Review II. Key Objectives for Proof of Concept", internet article https://ia802601.us.archive.org/4/items/pdfy-esMcC00dkmdo53/ IBM Practitioner Perspective—Pre Publication Draft, Jan. 7, 2015.

Watanbe Hiroki et al., "Blockchain contract: a complete consensus using blockchain", 2015 IEEE 4$^{th}$ Global Conference on Consumer Electronics, IEEE, Oct. 27, 2015, pp. 577-578.

* cited by examiner

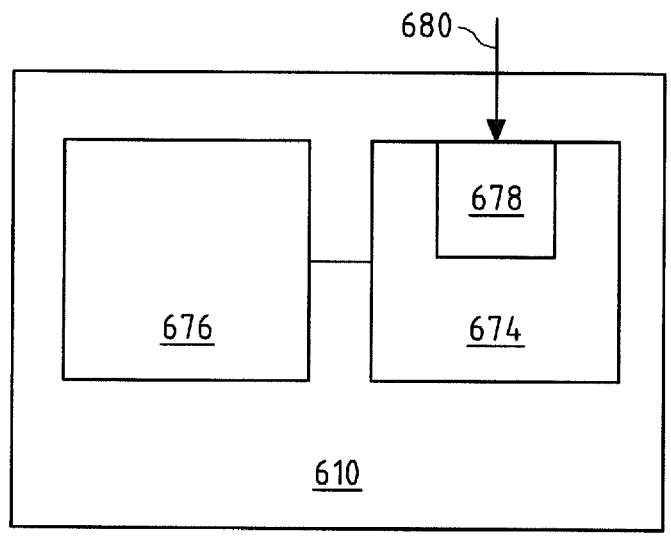
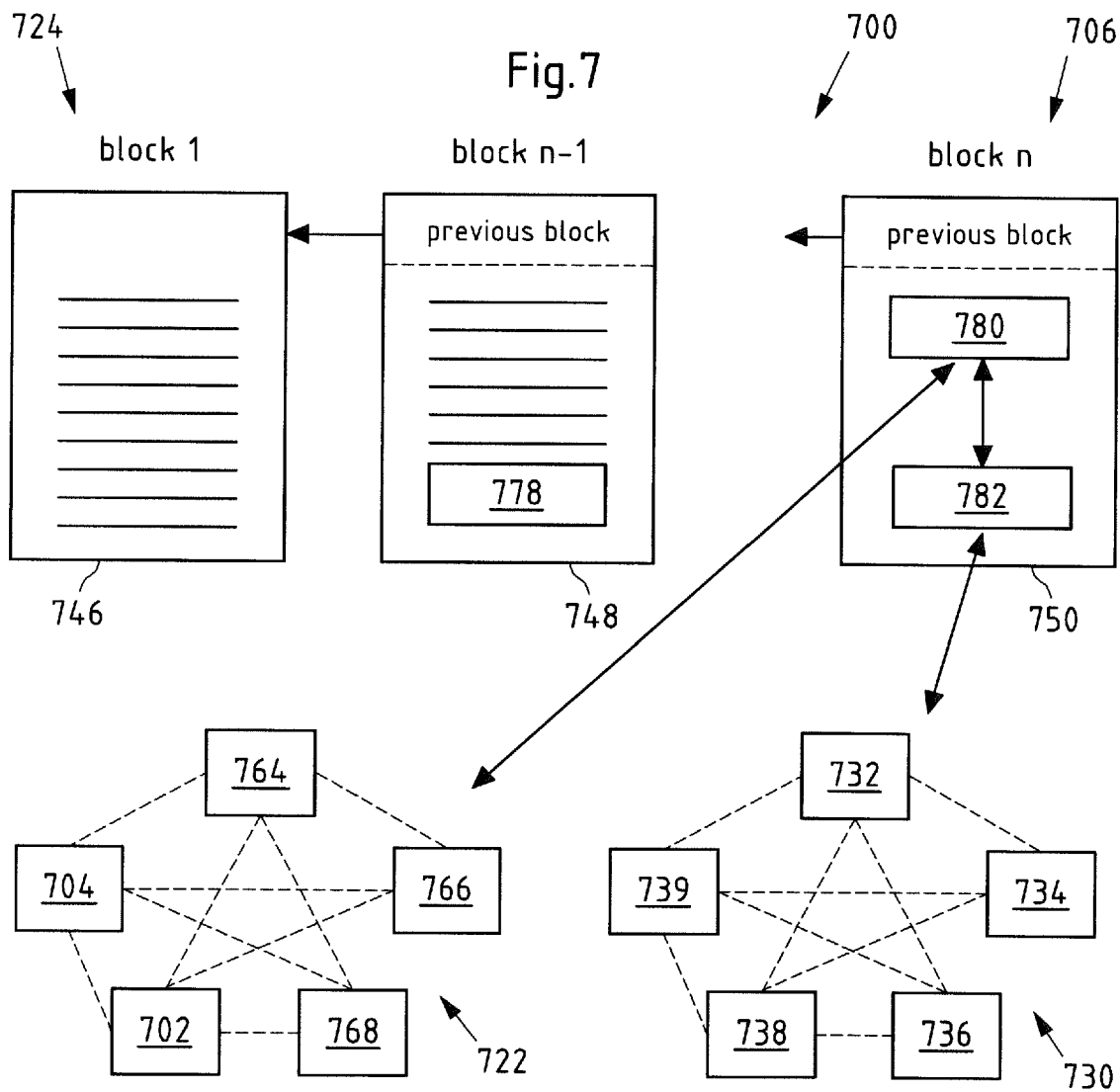

SYSTEM AND METHOD FOR TRANSPORTING AN OBJECT

CROSS-REFERENCE TO RELATED PATENT APPLICATION

This patent application is a continuation of PCT/EP2015/076098, filed Nov. 9, 2015, the entire teachings and disclosure of which are incorporated herein by reference thereto.

FIELD OF THE INVENTION

The invention relates to a system and method for transporting an object. The invention relates also to a locking unit of an object to be transported.

BACKGROUND OF THE INVENTION

It is known from prior art transport systems to transport an object via at least one mobile transport unit from e.g. a first entity to a further entity. Examples of objects to be transported which are not exhaustive are goods, freight, letters, animals or humans. The mobile transport unit used for transportation of at least one object may depend on the object type and/or amount of object. Examples of mobile transport units are all vehicles, such as cars, trucks, ships, railway vehicles, planes, bicycles, drones, etc.

A mobile transport unit can use at least one suitable transport channel of a transport network, such as suitable transport routs. It shall be understood that in order to transport an object from a first entity to a further entity one or more (different or equal) mobile transport units can be used. For instance, suitable delivery stations can be provided for delivering an object from a first mobile transport unit to a further mobile transport unit. An entity may be a building, a household, a plant or machine, an electronic unit, etc.

Common to all prior art transport systems are that the transport of the object is managed by a central transport provider entity. In particular, a first entity having a client device can communicate with a central server in order to generate an object transport agreement about the physical transport of the object at least partly by means of the mobile transport unit between the first entity and a further entity. Then the central server controls the at least one mobile transport unit such that the object is transported by the mobile transport unit.

A typical prior art system 100 is shown in FIG. 1. A first entity 102 and a further entity 104 are each connected to a physical transport channel network 112. For example, an object 110 should be transported from the first entity 102 to a further entity 104 by means of a mobile transport unit 108 using the physical transport channel network 112. By way of example, the first entity 102 may produce the object 110. Therefore, the first entity 102 can also be called a producer. The further entity 104 may consume the object 110. Thus, the further entity 104 may also be called a consumer. It shall be understood that an entity can be both producer and consumer, and thus, can be called prosumer.

As can be further seen from the FIG. 1, the mobile transport unit 108 is provided and controlled by a transport provide server 106. In order to use the mobile transport unit 108 for transporting the object 110, at least one of the entities 102, 104 comprises a client (not shown) configured to communicate with the server 106 via a communication connection 114, for example an internet connection.

This means that the central server 106 can, based on a query or request message from the client device of e.g. the first entity 102, generate an object transport agreement between the server 106 and the first entity 104 about the transport of the object 110 from the first entity 102 to the further entity 104 using the mobile transport unit 108. The object may then be transferred from the first entity 102 to the further entity 104 via the physical transport channel network 112 by means of the mobile transport unit 108. The billing of the transport of the object 110 is also carried out by the central instance 106.

The disadvantage of server-client structures of this kind, particularly the server (or platform), apart from the high transaction costs, is that the central instance or central server manages customer data. A persistent problem affecting the central instance is that of protecting the customer data stored on one server/a plurality of servers from access by unauthorized third parties. In particular, a high degree of security expenditure is required, in order to prevent customer data, billing data, forecast data, etc. from being tampered with. This in turn leads to higher transaction costs.

Therefore, the object of the invention is to provide a system which simplifies the generation of an object transport agreement and, at the same time, offers a high level of security.

BRIEF SUMMARY OF THE INVENTION

The object is solved according to a first aspect of the present invention by a system as described herein. The system, in particular, a transport system, comprises at least one transport broker entity at least configured to provide at least one mobile transport unit. The mobile transport unit is configured to transport at least one object. The transport broker entity comprises a first peer-to-peer module configured to communicate with at least a first peer-to-peer application of a first peer-to-peer network. The system comprises a first entity comprising a peer-to-peer module configured to communicate with at least the first peer-to-peer application of the first peer-to-peer network. At least upon a triggering by the first peer-to-peer module of the transport broker entity and/or the peer-to-peer module of the first entity, the first peer-to-peer application is configured to generate an object transport agreement about the physical transport of the object at least partly by means of the mobile transport unit between the first entity and a further entity.

In contrast to the state of the art, an object transport agreement is easily generated according to the invention between two entities without a central instance, by the fact that instead of a central server or a platform, a peer-to-peer network (also called a framework) undertakes the tamper-proof generation of an object transport agreement by means of a peer-to-peer application. In the case of a peer-to-peer network, high security standards are achieved in that all computers (peer nodes) in the network, at least a part of the peer computers in the network, monitor(s) the accuracy of object transport agreements and the accuracy of logistics route planning and optimisation. The transaction costs can be significantly reduced. No central, superior platform, server, cloud, etc. is required.

The system according to the present invention is characterized by at least one mobile transport unit configured to transport at least an object via a transport channel network. The at least one mobile transport unit may be a vehicle, such as a car, truck, ship, railway vehicle, plane, bicycle, drone, etc. The vehicle may be an autonomously operated vehicle.

The mobile transport unit is configured to transport at least one object between at least two stations, e.g. between a first entity and a further entity. The at least one mobile station is provided by a transport broker entity. The transport broker entity can provide and directly control the mobile transport unit. Alternatively, the mobile transport vehicle can be controlled by another (sub) transport provider entity, wherein said mobile transport vehicle can be procured/provided by the transport broker entity. In particular, a particular transport capacity of the at least one mobile transport unit can be provided.

The transport broker entity comprises at least one peer-to-peer module. The peer-to-peer module is configured to communicate with a first peer-to-peer network, also called computer-computer network. In comparison to a client-server network in which a server provides a service and a client uses the service, these roles are cancelled in a peer-to-peer network. Each participant of the peer-to-peer network can use a service and the like and offer such a service. In particular, a peer-to-peer network is self-determined and/or self-organized (without any higher-level units). In the present case preferably each computer of the first peer-to-peer network comprises a first peer-to-peer application. In particular, the peer-to-peer module is configured to send messages to the peer-to-peer application and/or read data stored in the peer-to-peer application.

It is noted that the transport broker entity may be represented by a smart contract on the peer-to-peer application, such as a block chain, or a decentral autonomous organisation (DAO) on the peer-to-peer application, such as a block chain. In this case, the peer-to-peer module can also be formed by a smart contract or DAO. In another embodiment, the transport broker entity may be a mobile transport unit.

Furthermore, the present system comprises a first entity. The first entity comprises a peer-to-peer module. The peer-to-peer module is configured to communicate with the first peer-to-peer application of the first peer-to-peer network.

The peer-to-peer application is at least configured to generate an object transport agreement about the transport of at least one object. The peer-to-peer application is characterized in that the peer-to-peer application or the data content of the peer-to-peer application can be accessed and, in particular, controlled by all participants in the peer-to-peer network. It shall be understood that two or more, in particular different, peer-to-peer applications can be provided by a first peer-to-peer network.

Examples of objects to be transported which are not exhaustive are goods, freight, letters, animals or humans.

An object transport agreement may, in particular, include data about at least the participating entities, such as the first entity, a further entity and/or the transport broker entity. Examples of these data can include a unique ID and/or hash code, such as at least one (peer-to-peer) network entity address known to at least all participants of the peer-to-peer network. Further, the object transport agreement can comprise at least an indication about at least one object to be transported including parameters such as weight, physical dimensions or physical requirements such as cooling or pressure, the at least one mobile transport unit to be used, time data, such as a delivery date and/or a pick-up date, location data, such as a pick-up location (e.g. address of first entity in the transport channel network) and a delivery location (e.g. address of the further entity in the transport channel network) and/or at least one transaction criterion and/or at least one Service-Level-Agreement (SLA) requirement and/or insurance requirement. Through suitable checking and/or validation algorithms, such as digital signatures and/or hash functions, the accuracy and/or constancy of a generated object transport agreement can, in particular, be guaranteed by the cumulative processing power of the computer in the peer-to-peer network.

It can also be checked if a SLA requirement is met by a producer, a transport unit and/or a consumer (e.g. delivery in time, pick-up obligation fulfilment by producer or consumer or cooling requirements). These SLA requirements can be preferably tracked and be used for an assessment of reliability of entities and/or transport units in order to build up a reputation system. Reputation of anonymized participants can e.g. be tracked and made transparent in order to increase trust and predictability.

The generation of an object transport agreement can be triggered or caused by the peer-to-peer module of the first entity and/or by the first peer-to-peer module of the transport broker entity. For example, an object transport agreement can be triggered or initiated by transmitting a message comprising an instruction on the generation of the object transport agreement. In particular, a suitable code and, where necessary, at least one key for verifying the sender of a message and/or the authenticity of a message can be transmitted to the peer-to-peer application or written into the peer-to-peer application by the peer-to-peer module. Preferably following a confirmation message from the further entity comprising a suitable instruction and, where necessary, at least one key for verifying the sender of the confirmation message, a corresponding object transport agreement can be advantageously generated following a check by the peer-to-peer network of the peer-to-peer application.

The list of all (anonymised) participants or entities can preferably be made known to each participant, so in particular to each entity of the transport system, as an identifier, e.g. in the form of a communications address.

Following the generation of an object transport agreement, the object can be transported accordingly between the first entity and the further entity at least partly by the mobile transport unit. For example, an object can be transported by a mobile transport unit, such as a drone, directly from the first entity to the further entity (or vice versa). It shall be understood that according to other variants, the pick-up location and/or delivery location might be different, such as a particular delivery station and/or pick-up station. It shall be further understood that two or more mobile transport units can be involved for transportation of the at least one object. Thereby, two or more objects can be transported.

A peer-to-peer module can be at least partially formed by a software module and/or at least partially formed by hardware module.

According to a first embodiment of the system according to the invention, the transport broker entity can comprise a transport provider entity configured to control the at least one mobile transport unit. For instance, the transport broker entity can (also) be a transport provider entity. The transport provider entity can operate at least one mobile transport unit configured to transport one or more objects. In particular, based on a generated object transport agreement, the transport provider entity can cause the mobile transport unit to transport an object depending on the agreed conditions of the object transport agreement. Furthermore, the transport provider entity can indicate an information about free capacities of the at least one mobile transport unit via the first peer-to-peer application. In particular, the first peer-to-peer module can send respective messages to the peer-to-peer application. This allows other peer-to-peer modules of other entities to obtain information of free capacities and/or transport conditions or criterions, such as above described data. Thereby, the correctness of the offered capacity of the at least one mobile transport unit can be verified by at least a part of the peers of the peer-to-peer network, e.g. by a comparison with previously stored data in the peer-to-peer application.

Alternatively or additionally, the transport broker entity comprises a second peer-to-peer module configured to communicate with at least a second peer-to-peer application of a second peer-to-peer network. At least one sub transport provider entity comprising a peer-to-peer module configured to communicate with the second peer-to-peer application of the second peer-to-peer network can be provided. The sub transport provider entity is configured to control or operate the at least one mobile transport unit or at least one further mobile transport unit. The transport broker entity can be participant of the first peer-to-peer network and of a second peer-to-peer network. For instance, the second peer-to-peer network can comprise one or more sub transport provider entity/ies. Each of the sub transport provider entities can operate at least one mobile transport unit. Furthermore, each of the sub transport provider entities can comprise a respective peer-to-peer module configured to communicate with the second peer-to-peer application, e.g. by writing data into the second peer-to-peer application and/or reading data from the second peer-to-peer application. For instance, a free capacity information of at least one mobile transport unit during a particular future time period can be written into the second peer-to-peer application. The at least one transport broker entity can receive and/or read the respective information by its second peer-to-peer module. The second peer-to-peer module can be connected to the first peer-to-peer module. Thereby, data or information from the second peer-to-peer application, such as above free capacity data, can be written into the first peer-to-peer application (and vice versa). Based on these data, the first peer-to-peer application can be configured to generate a previously described object transport agreement between a sub transport provider entity (e.g. not part of the first peer-to-peer network) and a first entity (e.g. part of the first peer-to-peer network) through the intermediary of the transport broker entity. It shall be noted that there can be two object transport agreements: A first agreement between the transport broker entity and at least one of the sender and receiver entity of the at least one object. A second agreement between the transport broker entity and the sub transport provider entity providing at least one mobile transport unit for transporting said object.

According to a further embodiment of the system of the present invention, the object transport agreement can comprise at least one object delivery condition. At least a part of the peer-to-peer network can be configured to verify the fulfilment of the delivery condition such that the delivery of the object and/or the release of a function of a delivered object is/are only performed upon a positive verification of the delivery condition. In order to increase the security of the exchange of an object between a first entity and a further entity, the actual delivery of the object can depend on a previously agreed delivery condition (e.g. who is authorised to unlock the object). The fulfilment of the delivery condition can be preferably performed by means of the peer-to-peer application. By way of example, the delivery condition can be a given amount, particularly of a cryptocurrency (or a fiat currency) which must be transferred from one entity to the other entity. The specified amount can be transferred to the other entity within the framework of a transaction criterion transaction by means of the peer-to-peer network, in particular the peer-to-peer application. In a similar manner to that described above, the unique keys of the entities can also be used for verification for this transaction. The keys and, in particular, the actual possession of the amount by an entity can be checked by the peer-to-peer network, as described above, for example. Secure payment can be made by means of a peer-to-peer network without a central instance. Transaction costs can be further reduced. After the positive verification of the transfer of the specified amount by at least a part of the peers of the respective peer-to-peer network, the delivery of the object can be finalized. For instance, the transport broker entity can control the mobile transport unit such that the object is delivered. Additionally or alternatively, an operation of the transported object can be released.

It shall be understood that the fulfilment of the delivery condition can also be conducted using other means. In this case, the fulfilment of the delivery condition can be written into the peer-to-peer application by an entity trusted at least by the participants of the respective peer-to-peer network. Then a release information can be written into the peer-to-peer network.

According to a preferred embodiment of the system according the present invention, the object (to be transported) can be provided with a locking unit configured to lock at least one function of the object. The locking unit can comprise an interface configured to receive a release information causing the locking unit to unlock the operation of the object. The locking unit can preferably prevent the initial operation of an object until a receipt of a release information. For instance, in the case of an electronically operated object, the power supply can be locked. Another example of a locking can be an encryption of data or the like. In this case, unlocking means decryption of the data or software. A further option can be a physical locking unit in form of an enclosure, such as a safe. The object can be enclosed by the physical locking unit. In order to unlock the operation of the object, the locking unit has to be opened (e.g. by entering a password and/or identification). Then, the object can be removed from the locking unit e.g. to use it according to its intended use.

The locking unit is preferably provided with an interface. The interface can be a user interface enabling a manual input of a release information. Alternatively or additionally, the interface may enable to receive release information from another device, such as a scanning device. Another example can be a network interface for a mobile and/or wired network, such as an internet interface. After receipt of a release information caused by a positive verification of at least a part of the peers of the respective peer-to-peer network, the locking unit can release the at least one function of the transported object. Alternatively or additionally a release request can be signed with the ID of a recipient. In case of positive verification of the ID and a check if the recipient's ID is authorised in accordance to a delivery condition to receive/unlock the object, the locking unit can release the at least one function of the transported object.

In a particular preferred embodiment, the first peer-to-peer application can be configured to generate the release information upon the positive verification of the delivery condition. The interface can be a peer-to-peer interface configured to receive the generated release information from the first peer-to-peer application. In other words, the locking unit can comprise an peer-to-peer interface configured such that at least particular information (at least the release information for said object) can be obtained or read from the peer-to-peer application of the peer-to-peer network.

Furthermore, according to another embodiment, the first peer-to-peer application can be configured to generate a unique object transport agreement identification for each object transport agreement based at least on a private key and/or public key of the first entity and/or the further entity. By generating a unique identification for each object transport agreement, events or processes related to the respective object transport agreement can be easily identified and a respective verification can be performed by at least a part of the peers of the peer-to-peer network. For instance, a release information can be assigned to an object by means of the unique object transport agreement identification.

In a preferred embodiment of the present invention, the object may comprise a coding unit. The coding unit may comprise at least the unique object transport agreement identification. By way of example, the coding unit can be a scannable barcode or a RFID tag. The coding unit can be attached to the object and/or a packaging of the object. The coding unit can comprise the unique object transport agreement identification. For instance, a storage means of the RFI tag can comprise the unique object transport agreement identification. This allows tracking the path of the object during transportation by the peer-to-peer network. Furthermore, the coding unit may be at least connected to a locking unit.

In a preferred embodiment, the at least one locking unit and the at least one coding unit can be realized by a single unit.

In particular, pick-up stations, delivery stations and/or mobile transport units may comprise a scanning unit having a peer-to-peer interface configured at least to transmit data to the peer-to-peer application. During the transportation phase, the respective scanning units can read the unique object transport agreement identification from the coding unit, e.g. a barcode or RFID tag. The read unique object transport agreement identification can be transmitted to the peer-to-peer application preferably together with further data, such as a time stamp and/or location data related to the respective scanning unit. Then, at least a part of the peers of the peer-to-peer network can verify the correctness of the transportation path and/or the fulfilment of a previously agreed time frame. Furthermore, the involved entities, such as the sender and receiver of the object can obtain the actual status of the transportation of the object by means of the peer-to-peer application.

According to a further embodiment of the present system, at least upon triggering by the peer-to-peer module of the first entity and/or a peer-to-peer module of the further entity, the first peer-to-peer application can be configured to generate an object transaction agreement about the physical exchange of the object between the first entity and the further entity. For instance, the present transport system can comprise at least a first entity and another entity at least connectable to each other via a transport channel network. The transport channel network can comprise different transport channels, such as air channels, water channels (e.g. rivers, sea) and/or land channels (e.g. streets, railways). One of the entities may produce or provide at least one object and at least one further entity can receive or consume this object. Generally, a transport system may include different types of entities, so long as they can be connected to the physical transport channel network. An entity may be, for example, a building, part of a building, like an apartment, a single (intelligent) device or machine, a company, a processing device or the like.

Delivery network optimisation and route planning for one or more transport/s of object/s can be done by the peer-to-peer application or network (on-chain) and/or the peer-to-peer application or network can supervise an optimisation and route planning process application (off-chain).

The peer-to-peer application can be checking the tracking data for congestions or deviations from a delivery schedule. Mobile transport units can (regularly) send status messages to the peer-to-peer application about e.g. congestions or technical failures. In case of congestions or technical failures the route planning can be re-arranged among e.g. the sub transport providers. Route planning can be rearranged in real-time based on reactive status and tracking data (e.g. in case of congestions or technical failures). This process can be preferably controlled by the peer-to-peer application and reconfirmed with entities and transport objects. Real-time rearrangements can also be done based on the portfolio of transport unit data. Based on this portfolio data congestions can be predicted and routes can be re-arranged.

The peer-to-peer module of at least one of the entities can be configured to cause a generation of an object transaction agreement about the exchange of an object between the first entity and a further entity by means of the peer-to-peer application, in particular, via the at least one mobile transport unit. The peer-to-peer module of an entity can be adapted to cause a generation of an object transaction agreement between the first entity and a further entity, for example, by sending a message comprising instructions to generate an object transaction agreement to the peer-to-peer network. In particular, a suitable code and, if necessary, at least one key to verify the sender of a message and/or the authenticity of a message can be transmitted to the peer-to-peer application or written into the peer-to-peer application from the peer-to-peer module of the entity. Preferably, upon an acceptance message comprising suitable instructions and optionally at least one key to verify the sender of the acceptance message from the other entity, e.g. from a peer-to-peer module of the other entity, and after a review by the peer-to-peer network a corresponding object transaction agreement can be generated. In simple terms, any peer-to-peer module can select one or more suitable partners for the exchange of an object using the peer-to-peer network or the peer-to-peer application. Further, a peer-to-peer module can cause the generation of an object transaction agreement by means of the peer-to-peer application. An object transaction agreement may in particular comprise information about at least the two participating entities or respective peer-to-peer modules, such as a unique ID and/or hash code, the object/s to be exchanged e.g. until a particular delivery date or similar time data, at least one transaction criterion, such as the above described delivery condition, and/or at least a reference to the respective object transport agreement, such as the unique object transport agreement identification. Similarly, an object transport agreement can be caused and generated. It shall be understood that different possibilities can exist for transport agreements in a transportation market based on different transportation options and availabilities. Based on transaction criteria and prices the peer-to-peer application can select the base option for choosing a specific transportation agreement.

It shall be further understood that the object transaction agreement can be part of the object transport agreement or vice versa. For instance, a single agreement can be agreed between the first entity and the further entity and the transport broker entity about the physical transport of at least one object.

In a further embodiment, the object transaction and/or transport agreement can comprise a transaction criterion, e.g. a total price. The total price may comprise the price for production of at least one object of at least one entity and the price for the transport by the at least one mobile transport unit of the at least one transport provider entity. For instance, a respectively configured smart contract of the peer-to-peer application or a DAO can calculate a total price.

In particular, by means of the peer-to-peer application, an optimizing process can be performed (on chain or off chain) to obtain the best agreement regarding the transport and transaction criteria, such as price, reputation information, transport requirements, of the requesting entity. For instance, several individual and independent offers can be combined by means of the peer-to-peer application. Different mobile transport units independent from each other, such as drones, railway vehicles, taxis and/or bicycles, can be combined and synchronized to each other for the transportation of at least one object by means of the decentral peer-to-peer application.

According to an embodiment, the time of completion of the production of at least one object (to be transported) and the pick-up time of said object can be synchronized. For instance, after generation of an object transaction and/or transport agreement, the production of the at least one object can be initiated such that the time of completion of the production of the at least one object and the pick-up time of said object are synchronized.

Furthermore, the transport broker entity can be configured to provide the mobile transport unit by providing a capacity of the mobile transport unit between two or more particular delivery stations. In one embodiment, the transport broker entity can be a part of the mobile transport unit.

In another embodiment, the transport broker entity can (also) provide a gateway to at least one centralised system of at least one sub transport provider.

According to a preferred embodiment of the present transport system, at least the first peer-to-peer application can be a decentralized register. Preferably, the second peer-to-peer application can (also) be a decentralized register. A decentralized register can be readable at least by a part of the participants of the peer-to-peer network. In particular, every computer node including the peer-to-peer module of e.g. a first entity, a further entity and/or the first peer-to-peer module of the transport broker entity can comprise the peer-to-peer application. The decentralized register may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. In a simple way information can be made available to preferably all participants. This allows to carry out a review of the information stored in the decentral register. Particularly preferably, each computer in the peer-to-peer network can be configured to review new information, in particular based on older information stored in the peer-to-peer application.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least by a part of the computers. The tamper resistance of the data stored in the peer-to-peer application can thereby be further improved.

In order to store new information in a tamper-proof way, at least the first peer-to-peer application can comprise encryption means and/or signature means and/or verification means, wherein at least one of the encryption means and/or signature means and/or verification means is configured to store at least the provided object transport agreement. Preferably, the second peer-to-peer application can (also) comprise encryption means and/or signature means and/or verification means. At least one means of the aforementioned means may be adapted to store at least every object transport agreement. In particular, it can be provided that by the hash function a link is established with at least one previously stored information in the decentral register. Further data, such as request messages, ordinary, contextual and/or transaction data of an entity can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the system, at least the first peer-to-peer application can be a block chain or decentral ledger comprising at least two blocks coupled to each other. The block chain technology or "decentral ledger technology" is already used in the payment by means of a crypto currency, such as Bitcoin. It has been recognized that by a particular configuration of a block chain, at least the correctness of an object transport agreement can be checked without the need of a central server. In addition, the block chain can be used to generate an object transaction agreement between two entities in a tamper-proof manner. The block chain according to the present embodiment is particularly a decentralized, peer-to-peer-based register in which all data related to a transport of an object between two entities and other messages sent be peer-to-peer modules can be logged. A block chain is particularly suitable as a technical means to replace a central entity in a simple and secure manner.

Data of the peer-to-peer application can be stored on the "decentral ledger technology" and/or the de-central ledger steers (encrypted) data storage accessible via the internet and preferably in de-central data storage entity such as Interplanetary File System (IPFS).

In a further embodiment, the at least one peer-to-peer network can be formed by a plurality of computer nodes and the peer-to-peer module is only configured to communicate with the plurality of computer nodes. In other words, the peer-to-peer module is not a computer node of the peer-to-peer network. Such a peer-to-peer module does not comprise the peer-to-peer application but only provides an interface module, such as an application programming interface (API), and a decentral application for communication with the computer nodes of the peer-to-peer network or the peer-to-peer application, such as a block chain. This allows reducing the required processing power of the peer-to-peer module. In one implementation of the peer-to-peer network there can be only one validating peer or full node, e.g. only one node can be configured to perform a validation process, and one or more observing nodes. An observing node can validate transactions to establish a trust level but do not validate all transactions which is done by the validating peer.

In an alternative embodiment, the peer-to-peer network is formed by a plurality of computer nodes and the peer-to-peer module is one of the computer nodes. In this case, the peer-to-peer module comprises at least a part of the peer-to-peer application. For instance, the peer-to-peer module might be a so called light node. In particular, the peer-to-peer module can comprise preferably the total data content of the peer-to-peer application.

A further aspect of the present invention is a method for operating a system, in particular, a previously described system. The system comprises at least one transport broker entity at least configured to provide at least one mobile transport unit, wherein the mobile transport unit is configured to transport at least one object, wherein the transport broker entity comprises a first peer-to-peer module configured to communicate with at least a first peer-to-peer application of a first peer-to-peer network, a first entity comprising a peer-to-peer module configured to communicate with at least the first peer-to-peer application of the first peer-to-peer network. The method comprises triggering by a first peer-to-peer module of the transport broker entity and/or the peer-to-peer module of the first entity the first peer-to-peer application such that an object transport agreement is generated about the physical transport of the object between the first entity and a further entity at least partly by means of the mobile transport unit.

The method can be a computer program comprising instructions for causing a processor to operate a peer-to-peer application as described above.

A further aspect of the present invention is a locking unit of an object to be transported by using a system, in particular, a previously described system. The locking unit is configured to lock at least one function of the object. The locking unit comprises at least one interface configured to receive a release information generated by a first peer-to-peer application of a first peer-to-peer application upon a positive verification of at least one delivery condition regarding the object causing the locking unit to unlock the at least one function of the object.

The locking unit can be attached or integrated in an object and/or an enclosure enclosing the object, such as a safe. In the latter case, unlocking the at least one function of the object means to release a locking mechanism such that the object can be removed from the enclosure. Removing the object may include that the object can be used according to the intended use of the object. In other words, unlocking the at least one function of the object means that the peer-to-peer application can authorize access to an object. It is noted that in the case the locking unit is an enclosure, the enclosure may be a mobile enclosure or a stationary enclosure, such as a storage.

According to a preferred embodiment of the locking unit according to the present invention, the locking unit may comprise at least one processing element. The processing element may comprise the first peer-to-peer application of the first peer-to-peer network. The processing element may be configured to cause the locking unit to unlock the function the at least one function of the object upon a positive verification of the delivery condition generated by a first peer-to-peer application. In other words, the locking unit and its at least one processing element, respectively, may form a peer-node of the first peer-to-peer application. The processing element may be a peer-to-peer module, as described above. The first peer-to-peer application may run on the locking unit. Since the first peer-to-peer application is running on the locking unit itself, the locking unit and its at least one locking mechanism can be (easily) controlled by the peer-to-peer application. In particular, the locking mechanism can be unlocked in response to a release information of the peer-to-peer application. As described hereinbefore, e.g. a safe can be opened or a connection to a power supply of an object can be established.

The features of the methods, systems or networks, devices, units and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

BRIEF DESCRIPTION OF THE SEVERAL VIEWS OF THE DRAWING

In the figures show:

FIG. 6 shows a schematic view of an embodiment of an object comprising an embodiment of a locking unit according to the present invention;

FIG. 7 shows a schematic view of a further embodiment of a system according to the present invention.

DETAILED DESCRIPTION OF THE INVENTION

Figure 1:
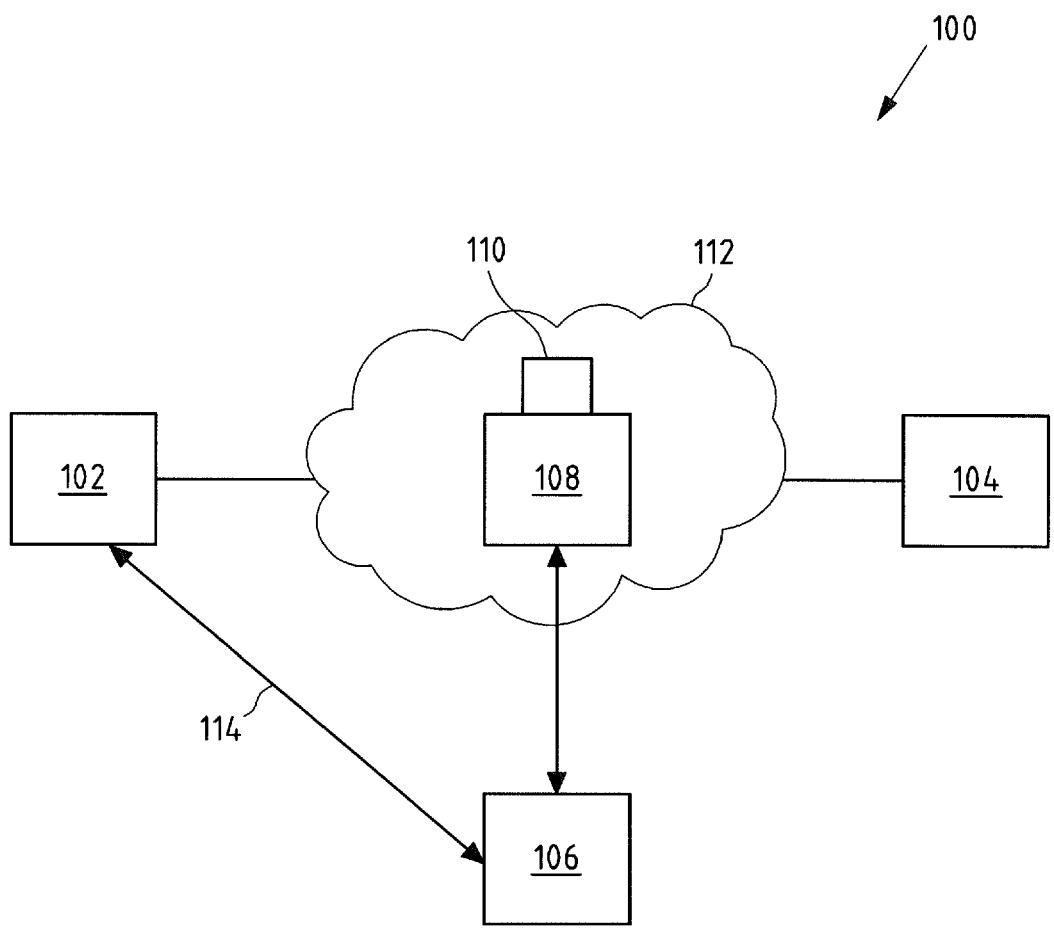
FIG. 1 shows a schematic view of an embodiment of a system according to prior art.

Like reference numerals in different figures indicate like elements.

Figure 2:
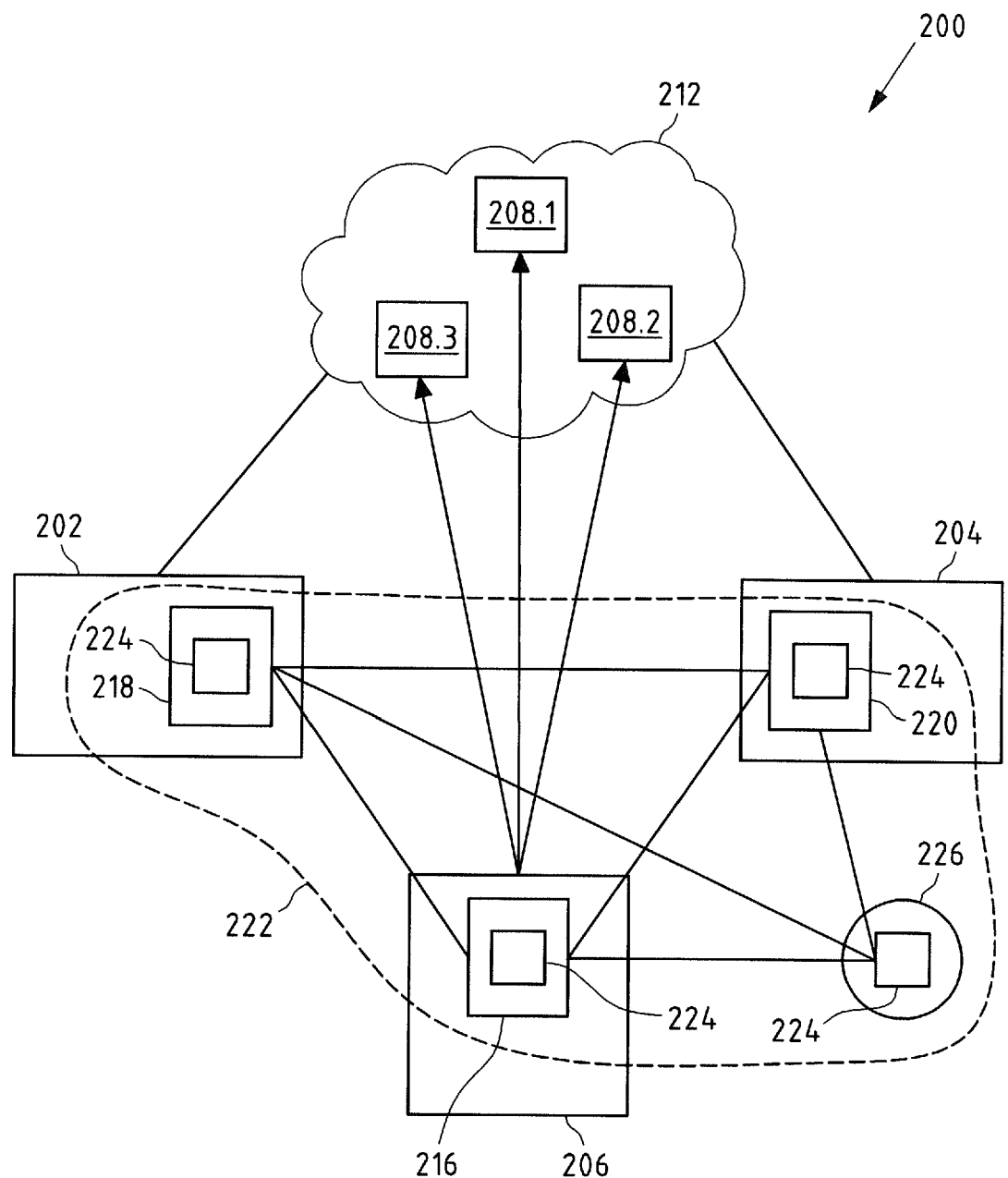
FIG. 2 shows a schematic view of a first embodiment of a system according to the present invention.

FIG. 2 shows a schematic view of a first embodiment of a system 200 of the present invention. The system 200 is in particular a transport system 200. The system 200 comprises a first entity 202 and a further entity 204 connectable to a transport channel network 212. It shall be understood that the system 200 can comprise more than two entities 202, 204 which are connectable to the transport channel network 212.

Furthermore, three exemplified mobile transport units 208.1 to 208.3 are depicted. The transport channel network 212 may comprise suitable transport channels, such as an air channel for an air vehicle 208.1, a water channel for a vessel 208.2 and/or a land channel for a land vehicle 208.3, such as a car or railway vehicle.

Furthermore, the transport channel network 212 can comprise one or more delivery stations (not shown). A delivery station can be configured to transfer/deliver at least one object from a first mobile transport unit 208.1 to 208.3 to another mobile transport unit 208.1 to 208.3. For instance, a delivery station can be configured to transfer an object from a car to a railway vehicle or from an aircraft to a car or the like. A delivery station may also be a pick-up station or a delivery station. In one example, the pick-up station may be the first entity 202 and the delivery station may be the further entity 204.

In the present embodiment, the depicted mobile transport units 208.1 to 208.3 are managed and in particular controlled by a transport broker entity 206. In the present example, the transport broker entity 206 is a transport provider entity 206. The transport provider entity 206 controls the depicted mobile transport units 208.1 to 208.3, e.g. can cause the mobile transport units 208.1 to 208.3 to move between at least two locations, such as two delivery stations.

Furthermore, each mobile transport unit 208.1 to 208.3 is configured to transport at least one object (not shown). It shall be understood that different mobile transport units 208.1 to 208.3 can be configured to transport different objects. Transporting an object may include that each mobile transport unit 208.1 to 208.3 can provide a particular transport capacity.

The transport provider entity 206 is configured to determine free transport capacity information of preferably all mobile transport units 208.1 to 208.3 controlled or managed by the transport provider entity 206. Furthermore, the transport provider entity 206 can be configured to determine additional information, such as route planning, estimated time to arrival, locations and congestions. A free capacity information may comprise the free space of a transport volume of a mobile transport unit 208.1 to 208.3 e.g. between at least two delivery stations, an identification of the respective mobile transport unit and/or time data, such as information about the maximum and/or minimum delivery and pick-up time. For instance, a free capacity information may comprise an indication about free containers of a railway vehicle moving between at least a start location and an end location (intermediate locations can be provided), wherein the railway vehicle has a starting time x and an ending time y. In another example, a free capacity information may comprise the range of a drone, indications about properties of objects which can be transported by the drone and at least one available time period of the drone. In each case, an identification of the respective mobile transport unit can be included. It shall be understood that free capacity information can depend on the type of the respective mobile transport unit.

A transport unit entity can be configured to determine its location (e.g. GPS data) and status information. Both information can be used for tracking and real-time re-routing purposes (e.g. in case of congestions or technical problems).

As the transport units can be trackable via e.g. the decentral ledger the peer-to-peer application can predict congestions and rearrange routes in real-time. Prediction data can be enriched with external traffic network systems. This can be done via a data feed into the peer-to-peer application.

In addition physical parameters can be measured (e.g. temperature, pressure) e.g. by at least one sensor at least connectable to the coding unit and preferably published via the peer-to-peer application (e.g. by using a RFID tag, such as the RFID tag described hereinafter). It can be checked if one or more transport requirements are met over the course of the transport. In case at least one requirement has been broken penalties can be automatically settled among the parties and a replacement can be ordered and shipped.

A substantial difference compared with a prior art systems, such as system 100 according to FIG. 1, is that no central instance is provided. In the present case, the system 200 has a first peer-to-peer network 222 or a first computer-computer network 222. The first peer-to-peer network 222 comprises a plurality of nodes 216, 218, 220, 226 or computers 216, 218, 220, 226. A peer-to-peer network 222 is characterized in the present case in that each node and/or participant is preferably connected to every other node and/or participant. In addition, the computers have equal rights, something which distinguishes them from a server-client structure.

The depicted nodes 216, 218, 220, 226 (each) comprise a first peer-to-peer application 224. As can be seen from FIG. 2, the same peer-to-peer application 224 is implemented on each node 216, 218, 220, 226. The first peer-to-peer application 224 may preferably be a public register 224 that can, in particular, be inspected by all participants (not only the nodes) of the peer-to-peer network 222. Each node 216, 218, 220, 226 preferably has the (entire) public register 224. It may also be envisaged that only part of the register can be provided on a node (light node). In a particularly preferred embodiment, the first peer-to-peer application 224 may be a block chain 224.

In addition, it can be seen that in the present case each entity 202, 204, 206 has a peer-to-peer module 216, 218, 220. A peer-to-peer module 216, 218, 220 is configured to communicate at least with the first peer-to-peer network 222, i.e. the nodes of the peer-to-peer network 222. In other words, the peer-to-peer module 216, 218, 220 or the entity 202, 204, 206 corresponding to the respective peer-to-peer module 216, 218, 220 is at least a participant of the peer-to-peer network 222. In this case, all participants of the peer-to-peer network 222 are preferably known to each participant of the peer-to-peer network 222.

In the present case, all peer-to-peer modules 216, 218, 220 are nodes or computers in the peer-to-peer network 222. Hence, all peer-to-peer modules 216, 218, 220 likewise comprise the first peer-to-peer application 224. It shall be understood that in other variants, a peer-to-peer module does not comprise the peer-to-peer application. Such a peer-to-peer module is configured to provide access to the peer-to-peer application e.g. via an API. Each peer-to-peer module may comprise a decentral application and at least an API. In the case, the peer-to-peer module is a node, the peer-to-peer module (also) comprises at least partly the peer-to-peer application.

In the present case, an object transport agreement about the exchange of an object between the entities 202, 204 can be generated by means of the peer-to-peer application 224 in a tamper-proof manner. For this purpose, the first peer-to-peer module 216 and/or at least one of the further peer-to-peer modules 218, 220 can communicate with the first peer-to-peer application 224 in order to cause the generation of an object transport agreement. Examples of objects to be transported which are not exhaustive are goods, freight, letters, animals or humans. The at least one object can then be transported at least by means of one mobile transport unit 208.1 to 208.3 according to the generated agreement.

An exemplary embodiment of a peer-to-peer application according to the invention is explained in greater detail below in the same way as the mode of operation of the system.

Figure 3:
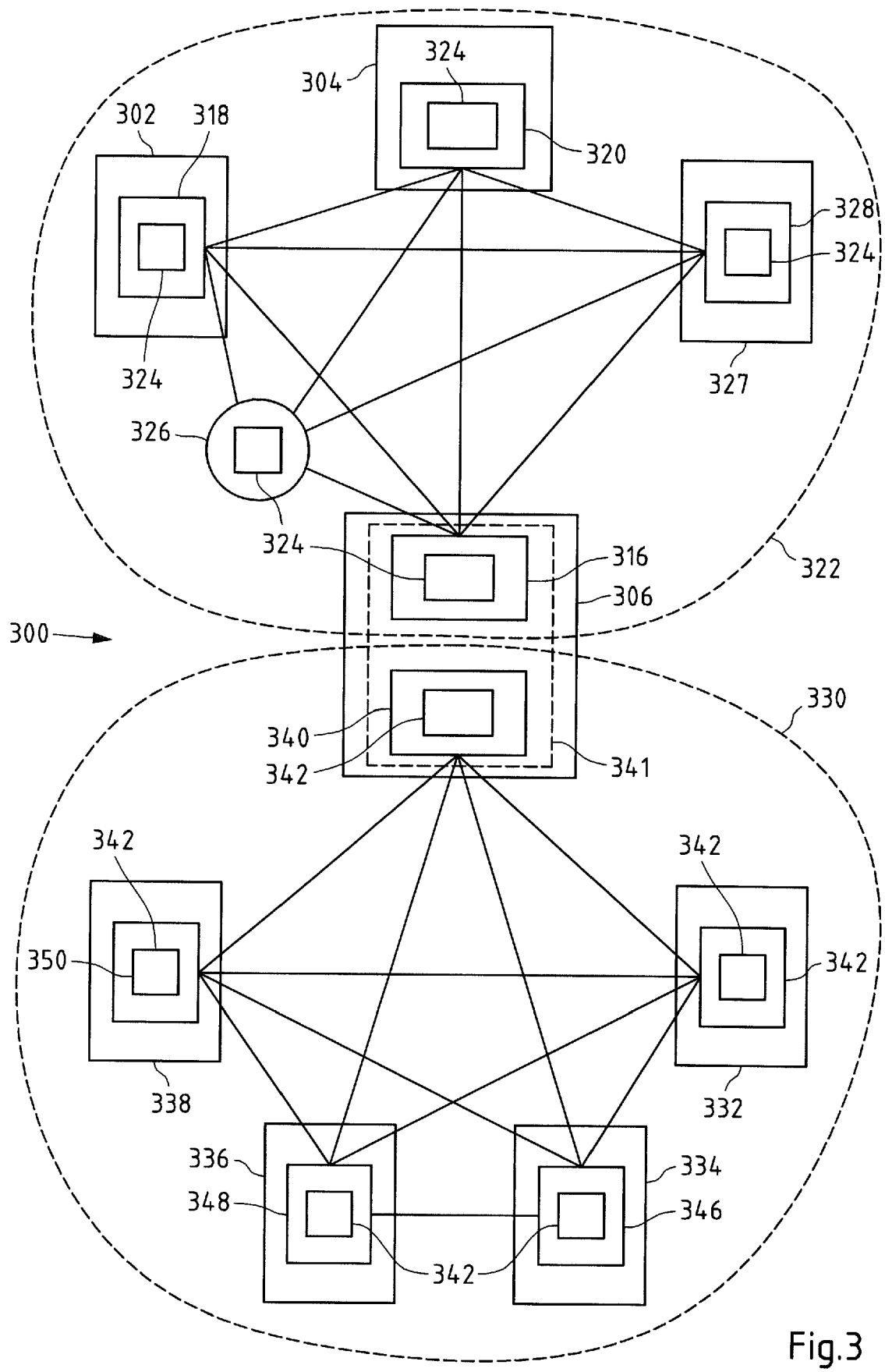
FIG. 3 shows a schematic view of a further embodiment of a system according to the present invention.

FIG. 3 shows a further embodiment of a system 300 according to the present invention. It shall be noted that for the sake of a better overview, the transport channel network and mobile transport units are not shown in the present example.

As can be seen from FIG. 3, the system 300 comprises a first peer-to-peer network 322 similar to the previously described first peer-to-peer network 222 of FIG. 2. In addition, a second peer-to-peer network 330 is provided. In the present case, the second peer-to-peer network 330 is formed by a second peer-to-peer module 340 of the transport broker entity 306 and by a plurality of further peer-to-peer modules 344 to 350 of respective entities 332 to 338. Each of the entities 332 to 338 may be a sub transport provider entity 332 to 338. Each sub transport provider entity 332 to 338 may provide and manage/operate at least one mobile transport unit (not shown).

Furthermore, the second peer-to-peer network 330 comprises a second peer-to-peer application 342. The second peer-to-peer application 342 can also be a decentralized register 342, such as a block chain 342. The first and the second peer-to-peer modules 316, 340 may be realised by one device 341, such as a computer. The computer may comprise a first and a second decentral application, respective first and second APIs and the respective first and second peer-to-peer applications 324, 342. The operation of the system 300 will be elucidated in more details hereinafter.

Figure 4:
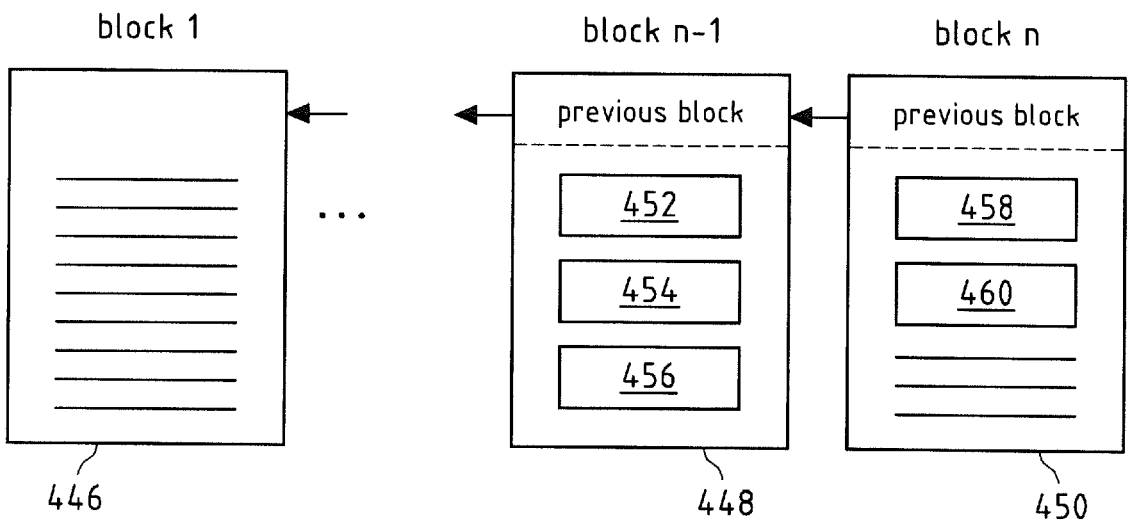
FIG. 4 shows a schematic view of an embodiment of a peer-to-peer application according to the present invention.

FIG. 4 shows a schematic view of an embodiment of a peer-to-peer application 424 according to the present invention. The peer-to-peer application 424 is a register readable in particular by the participants of the peer-to-peer network, such as the first and/or second peer-to-peer network. Thereby, messages can be written and/or read into/from the register by a peer-to-peer module of an entity and/or any other participants in the peer-to-peer network. In a preferred embodiment, the peer-to-peer application 424 may be a block chain 424.

Hereinafter, it is assumed in the following description of the present embodiment that the at least one peer-to-peer application 424 is a block chain 424. However, the following remarks can be easily transferred to other peer-to-peer applications.

The block chain 424 is formed by at least one block 446 to 450, preferably by a plurality of interconnected blocks 446 to 450. The first block 446 may also be called genesis block 446. As can be seen, a block 448, 450 (except for the first block 446) refers to each previous block 446, 448. A new block can be created by a computationally intensive process (for example, so called "mining" or through another appropriate process) and will be particularly provided to all participants of the peer-to-peer network.

The present block chain 424 is particularly adapted to receive messages from a peer-to-peer module of an entity, such as the first entity 302 or the transport broker entity 306, or from another peer-to-peer device of another participant of the peer-to-peer network and to save this message in the block chain 424. In particular, a new message in the current block 450 of the block chain 424 can be saved and published. Due to the configuration of a block chain 424 as a public register 424, the message of a peer-to-peer module of an entity can be read by preferably all participants of the peer-to-peer network.

In the present block chain 424 different types of messages, for example, within a smart contract (algorithm and/or storage at the block chain 424) can be processed and/or stored. By way of example, the message 452 comprises a generated object transport agreement.

Another message 454 can be a request message 454 for an object transport agreement. A request message 454 is characterized in that it can include e.g. the following data:
Object specification: object/s to be transported (e.g. details of properties of an object)
Time indication: e.g. due date, until the object should be delivered to a receiving entity
Location indication: address of the sending entity and/or receiving entity (e.g. desired pick-up and delivery addresses)
Transport criterion: criterion that must be met by the transport provider entity to complete an object transport agreement
Further criteria (SLA) Max/minimum delivery time, physical requirements, insurance It shall be understood that other transaction criteria can be defined. Further, more information can be, for example, a time stamp, a signature of the sender of the message, a message ID of the transaction and other criteria, such as an indication of the desired type of mobile transport unit to be used, etc.

Another message 456 may be an acceptance message 456 e.g. of the transport broker entity. An acceptance message 456 may comprise identical or at least similar data details as compared with a request message 454. Additionally, the acceptance message 456 can comprise a reference indication to a previous request, such as the ID of the request message 454. For example, it can be listed in an acceptance message 456 in relation to a request message 454 that a certain and desired amount of object/s can be transported from a pick-up station to a delivery station from a particular pick-up date until a particular delivery date in accordance with the transaction criterion. The amount of transportable objects may be a sub-amount of the requested quantity. It can also be given a lower/higher transaction criterion. Furthermore, another pick-up station and/or delivery station (which can be at least near the desired station) and the like can be given.

If an acceptance message 456 includes only a sub-quantity of the requested quantity, a higher or other transaction criterion, etc., the acceptance message 456 can be called a counter-offer message. This can be accepted by the first entity through an acceptance message. Based on this, the first entity, e.g. the peer-to-peer module, may cause the generation of an object transport agreement.

In particular, there can be multiple of such request messages and/or accepting messages and/or counter-offer messages. Each entity can give guidelines, according to which at least one object transport agreement can be generated. In a preferably automated, such as iterative process, each request message can be associated to an optimally corresponding acceptance message. The block chain 424 may also be configured to generate, based on similar messages of peer-to-peer modules of e.g. the first and the further entity (e.g. 202, 204) an object transport agreement 458.

An object transport agreement 452 (and/or an object transaction agreement 458) may be stored within a smart contract 452 in a block 450. A smart contract 452 may comprise computer program code. In the object transport agreement 452, in particular, the exchange or the delivery or receipt of a certain amount of object/s until a particular time point from a particular entity to a particular further entity and/or a transaction criterion as a given price, can be agreed between a first entity and a transport broker entity and/or a (sub) transport provider entity. For example, the first entity can cause the transport broker entity by means of the block chain 424 to generate an agreement that a mobile transport unit will collect at least one object from the first entity at a time point x and will deliver the object to a further entity until time point Y for a particular price.

Peer-to-peer market match making and/or optimization and/or real-time re-arrangements can be done by a smart contract and/or steered by a smart contract in case of off-chain computation.

In addition, a delivery condition can be defined in an object transport agreement 452. For instance, an actual delivery of an object to a further entity is only conducted, if the delivery condition is fulfilled, such as the transfer of particular amount of a cryptocurrency (or fiat currency) e.g. defined in an object transaction agreement, as described hereinafter. It shall be understood that the object transaction agreement can be part of the object transport agreement or vice versa. For instance, the first entity and the further entity and the transport broker entity can agree a single agreement about the physical transport of an object.

Furthermore, the first peer-to-peer application 424 may generate for each object transport agreement 452 a unique object transport agreement identification and assign this identification to the respective object transport agreement 452. Then, the object to be transported can be provided with a coding unit comprising the object transport agreement identification e.g. by a user of the first entity (if the first entity is the sender). E.g. in the case a coding unit passes an entity the passing event can be published in the peer-to-peer application e.g. for the purpose of cross-checking location data.

After a positive verification of the object transport data, an agreed transaction criterion transaction 460 can be generated and performed by means of the block chain 424. For instance, an agreed amount of a crypto currency can be transferred from the first entity and/or the further entity to the transport broker entity. Also this can be verified by the peer-to-peer network, in particular, the participants of the peer-to-peer network.

In particular, the peer-to-peer application 424 is configured to save the messages 452 to 460 in a tamper-proof manner. This is done essentially by the fact that through the entire peer-to-peer network, for example, an object transport agreement can be verified by the cumulative calculation power of the entire peer-to-peer network.

Preferably, at least the above described messages, such as the object transport agreements and other messages, can be hashed together in pairs in a block of the block chain by a Merkle tree. In particular, only the last hash value, the so-called root hash, is noted as a checksum in the header of a block. Then, the block can be coupled with the previous block. Chaining of the blocks can be performed using this root hashes. Each block can include the hash of the entire previous block header in its header. This makes it possible to clearly define the order of the blocks. In addition, this may also prevent the subsequent modification of previous blocks and the messages stored in the previous blocks, since in particular the hashes of all subsequent blocks would have to be recalculated in a short time.

Figure 5:
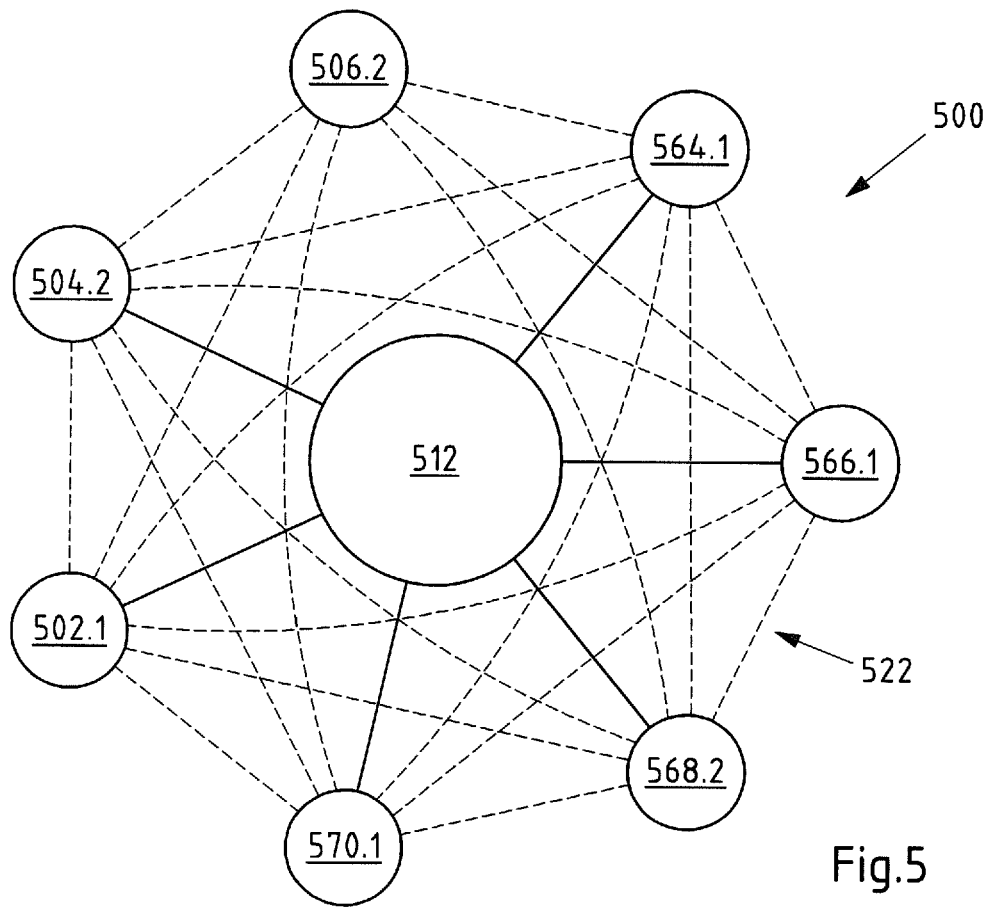
FIG. 5 shows a schematic view of a further embodiment of a system according to the present invention.

FIG. 5 shows a further embodiment of a system 500 according to the present invention. The illustrated supply system 500 comprises seven entities 502.1, 504.2, 506.2, 564.1, 566.1, 568.2, 570.1. The entities 502.1, 504.2, 564.1, 566.1, 568.2, 570.1 are connected or at least connectable to a transport channel network 512. The transport broker entity 506.2 is not connectable to the transport channel network 512. It shall be understood that in other variants also the transport broker entity 506.2 can be connected to the transport channel network 512.

As can be further seen, the entities 502.1, 504.2, 506.2, 564.1, 566.1, 568.2, 570.1 and their respective (not shown) peer-to-peer modules form a first peer-to-peer network 522 comprising a first (not shown) peer-to-peer application, for example, the block chain 424 according to FIG. 4.

The first entity 502.1 may be a household 502.1, which comprises e.g. a three-dimensional printer for producing first objects. The first entity 502.1 may therefore be referred to as a producer 502.1. The first entity 502.1 therefore can cause a transport of the produced object to a further entity. The first entity 502.1 can generate appropriate request and/or accepting messages and send these messages to the peer-to-peer network 522.

The further entity 504.2 may also be a household 504.2, in particular a prosumer 504.2. As a prosumer 504.2 the further entity 504.2 can deliver at least one object and can also receive at least one object. The prosumer 504.2 can generate appropriate request and/or accepting messages and send these messages to the peer-to-peer network 522.

The further entity 564.1 may be a producer 564.1, such as a factory 564.1. In other words, the entity 564.1 is adapted to sell objects. This entity 564.1 might also comprise a peer-to-peer module which can generate appropriate messages, as well as the following entities can comprise peer-to-peer modules as described above for generating appropriate messages.

Moreover, as an entity 566.1, an object storage 566.1 may be provided, such as an interim storage facility 566.1. The object storage 566.1 may in particular be configured to temporarily store at least one object. Further, an entity 568.2 may be an electrically powered machine 568.2, e.g. a (smart) electrical machine 568.2, such as an IoT device. The entity 570.1 may be, for example, a mobile transportation unit 570.1.

Furthermore, as can be seen from FIG. 5, two different types of peers or node computers 502.1, 564.1, 566.1, 570.1 and 504.2, 506.2, 568.2 are presently illustrated. All peers 502.1 to 570.1 are comprised by the peer-to-peer network 522. In the present embodiment, however, only part of the peers 502.1 to 570.1, in the present case, the peers 502.1, 564.1, 566.1, 570.1, check or verify the validity of the data stored in the peer-to-peer application messages, such as the object transport agreements or the object transaction agreements. Furthermore, only a part of the entire peers can be configured to store the peer-to-peer application and/or only a part of the peers can be configured to execute the algorithms of a smart contract. Since the validation/verification of e.g. object transport agreements or the object transaction agreements requires a considerable computational effort, it may be advantageous for reasons of efficiency, if only a part of the peers 502.1, 564.1, 566.1, 570.1, especially particularly powerful peers 502.1, 564.1, 566.1, 570.1, perform the validation/verification. Validation, optimization, network delivery planning, status/tracking data processing and/or re-scheduling can be done on-chain or off-chain. Off-chain validation, optimization, network delivery planning, status/tracking-data processing and/or re-scheduling can be managed by the peer-to-peer application, like the code on the block chain. Powerful means in particular a high computing power. In other words, in the present case a valid entry in the peer-to-peer application, such as a block chain, is assumed if (only) a part of the peers 502.1, 564.1, 566.1, 570.1 comes to a positive result. It shall be understood that only a single, especially particularly powerful peer can perform the validation process.

Similarly, in an alternative (not shown) embodiment a particularly large peer-to-peer network may be divided in two or more clusters. In a corresponding peer-to-peer network, for example, a validation will only be carried out by the members of one cluster. In one implementation of the peer-to-peer network there is one validating peer or full node and one or more observing nodes that can validate transactions to establish a trust level but do not validate all transactions which is done by the validating peer.

FIG. 6 shows a schematic view of an embodiment of an object 610 comprising an embodiment of a locking unit 674 according to the present invention. The object 610 may provide at least one particular function. The operation of this function may be locked by the locking unit 674 until the reception of a release information 680.

For instance, a power supply of the object 610 can be blocked until the locking unit 674 receives a release information 680. Upon receipt of the release information 680 via the interface 678, the operation of the object can be released e.g. by releasing the power supply of the object 610.

Preferably, the interface 678 can be a network interface 678. The network interface 678, in particular, a peer-to-peer interface 678 can be configured such that at least a release information 680 can be received or read from the first peer-to-peer network. By way of example, at least a part of the peers of the first peer-to-peer network have positively verified the fulfilment of a delivery condition related to the object 610. As a result, the first peer-to-peer application generates a release information 680. Thereby, the release information 680 can comprise as identification means the previously described unique object transport agreement identification.

Furthermore, the object 610 (and/or a packaging of the object 610 or the like) can be provided with a coding unit 676. The coding unit 676 can comprise the unique object transport agreement identification generated by the first peer-to-peer application. For instance, the coding unit 676 can be a RFID tag. Then, after generating the unique object transport agreement identification for a generated object transport agreement e.g. the sender of the object 610 can provide the object with the coding unit 676 and/or can write the unique object transport agreement identification into the storage means of the RFID tag 676. For instance, a suitable writing means e.g. comprising a peer-to-peer module at least configured to receive the unique object transport agreement identification can be configured to write the generated unique object transport agreement identification into the storage means of the tag 676.

During the transport of the object 610, the coding unit 676 can be read out by at least one suitable RFID reader. For instance, a delivery station and/or a mobile transport unit can be provided with a respective (mobile) RFID reader. A RFID reader can comprise a peer-to-peer module at least configured to write the unique object transport agreement identification read from the coding unit 676 together with e.g. a time stamp and/or location information related to the RFID reader into the first peer-to-peer application. Further data, such as status data of the object 610 can be read out of the tag 676 and written to the first peer-to-peer application.

The coding unit (e.g. RFID tag) can also comprise information to release the locking unit. This can be an unlock code encrypted with preferably the public ID of a recipient of the object. The recipient can encrypt the information with his private key to get the unlock code. This is especially useful when there is no network access or the peer-to-peer application is (currently) not available to get access to the object or to unlock the object. A similar approach can be used when handing over objects from one transport unit to another transport unit in order to make sure that only authorized transport units handle the object.

In another embodiment, the coding unit and/or locking unit can comprise the peer-to-peer application, such as the previously described block chain. For instance, the coding unit and/or locking unit can be at least a light node. The unlocking process can be controlled by the peer-to-peer application.

The coding unit and/or locking unit may be a single device, such as an enclosure, comprising at least one processing element which can comprise the peer-to-peer application.

Furthermore, if the coding unit is formed by a RFID tag, the RFID tag, in particular, the stored unique object transport agreement identification can be used as authentication means for access to at least one device in particular along an agreed transport path. For instance, such a RFID tag can enable the access to buildings, areas, vehicle, storage facilities, etc. These devices can have a reading unit which can be connectable to the peer-to-peer network. The reading unit can read out the identification and can transmit the identification together with e.g. an identification of the reading unit or the assigned device to the peer-to-peer application. For instance, the reading unit can comprise the peer-to-peer application or may have a gateway to the peer-to-peer application. After verification by at least a part of the peers of the peer-to-peer application, the access to the device can be enabled.

FIG. 7 shows a further embodiment of a system 700 of the present invention. The system 700 comprises two peer-to-peer networks 722, 730. The first peer-to-peer network may be a transaction market wherein the peer-to-peer application 724 can be at least configured to generate an object transaction agreement between at least two peers 702, 704, 764, 766, 768, such as a household 702, 704, an enterprise 764, an autonomous machine 768 or production assets/facilities 766. It is noted that this peer-to-peer application, according to one embodiment, can also be a central system. The further peer-to-peer network 730 may be a transportation marked peer-to-peer network 730 comprising sub transportation provider entities 732, 734, 736, 738, 739. For instance, a sub transportation provider entity 732, 734, 736, 738, 739 may be the mobile transport unit itself, such as a drone.

In this system 700, the transport broker entity 706 is formed by at least one smart contract 780, 782. Bay way of example, a smart contract transaction 780 and a smart contract transportation 782 can be provided e.g. by the transport broker entity 706. An object transport agreement can be generated e.g. between one or more entities or peers 702, 704, 764, 766, 768 of the first peer-to-peer network 722 and one or more peers or entities 732, 734, 736, 738, 739 of the further peer-to-peer network 730.

As indicated by the arrows, the smart contracts 780, 782 can interact with each other and the respective peer-to-peer networks 722, 230.

One option may be that the transaction market is a central system while the logistics market is peer-to-peer network and steered by e.g. the block chain. Physical delivery can be linked with this peer-to-peer application. The smart contract must not necessarily be on the same peer-to-peer application.

According to one embodiment, it is possible that the system interacts across two or more peer-to-peer applications (e.g. Bitcoin for the Transaction market and a specially configured block chain for transportation). Transactions across multiple peer-to-peer applications may be linked together via linking mechanisms, such as a "sidechain" mechanism.

Figure 8:
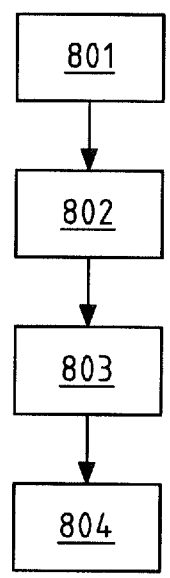
FIG. 8 shows a diagram of an embodiment of a method according to the present invention.

Eventually, FIG. 8 shows a diagram of a method according to the present invention. In a first step 801, a peer-to-peer module of a first entity can transmit a request message for a transport of an object to the first peer-to-peer application, as described above.

In a next step 802, upon reading the request message from the first peer-to-peer module, the at least one transport broker entity can send an acceptance message, as described above. In the case, the transport broker entity is at least also a transport provider entity the transport broker entity can offer at least one capacity of at least one mobile transport unit controlled by the transport broker entity. In addition, in particular in accordance with the embodiment shown in FIG.

3, the transport broker entity can read out capacity information provided by sub transport provider entities from the second peer-to-peer application. Then, by means of the first peer-to-peer application, the transport broker entity can procure an agreement with a sub transport provider entity. For instance, at least one of the sending and receiving entities of the object to be transported can cause a generation of a first object transport agreement between at least one of the sending and receiving entities and the transport broker entity by means of the first peer-to-peer application. In addition, by means of the second peer-to-peer application, e.g. a second object transport agreement between the transport broker entity and the sub transport provider entity can be generated.

It is noted that if there are two or more transport provider offers this situation can be settled via a market mechanism and/or a peer-to-peer optimization algorithm.

It shall be understood that prior, essentially at the same time, or after the generation of an object transport agreement, the sending and receiving entity can cause the generation of an object transaction agreement, as described hereinbefore.

Then, upon a triggering of at least one peer-to-peer module of the involved entities, an object transport agreement can be generated by the peer-to-peer application (step 803).

Eventually, the object can be transported and delivered in step 804 by means of one or more mobile transport units. It shall be understood, that prior to the actual delivery of the object, an entire (or only a part) of the agreed price in an object transaction agreement can be transferred in the form of crypto money from e.g. the further entity to the first entity. This can be performed by means of the first peer-to-peer network, in particular, in a tamper-proof manner. Especially, a plausibility test as described above can be carried out by at least a portion of the peers. Then the object can actually be delivered and/or released, as described above.

It shall be understood that a delivery condition can also define that a particular price is transmitted e.g. after the actual delivery of the object and/or a positive initial operation of the object.

Generally, the present system has the ability to validate individual data by nodes in the peer-to-peer network which is the basis for a "trustless" model. No trust in a central authority is needed. Validation and e.g. optimization of the peer-to-peer application or peer-to-peer matching can be done on-chain or off-chain, as described hereinbefore. Off-chain means that the process is controlled by the block chain. The process itself can be performed by other devices, such as servers/cloud. The block chain can check whether e.g. in the case of a validation process a plurality of servers provides a positive result or a negative result.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:
    at least one transport broker entity at least configured to provide at least one mobile transport unit,
    wherein the mobile transport unit is configured to transport at least one object,
    wherein the transport broker entity comprises a first peer-to-peer module configured to communicate with at least a first peer-to-peer application of a first peer-to-peer network,
    a first entity comprising a peer-to-peer module configured to communicate with at least the first peer-to-peer application of the first peer-to-peer network,
    wherein at least upon a triggering by the first peer-to-peer module of the transport broker entity and/or the peer-to-peer module of the first entity, the first peer-to-peer application is configured to generate an object transport agreement about the physical transport of the object between the first entity and a further entity at least partly by means of the mobile transport unit,
    wherein the transport broker entity is a transport provider entity configured to control the at least one mobile transport unit by causing the mobile transport unit to transport an object depending on the agreed conditions of the object transport agreement.

2. The system according to claim 1, wherein
    the transport broker entity comprises a second peer-to-peer module configured to communicate with at least a second peer-to-peer application of a second peer-to-peer network,
    wherein at least one sub transport provider entity comprising a peer-to-peer module configured to communicate with the second peer-to-peer application of the second peer-to-peer network is provided, and
    wherein the sub transport provider entity is configured to control the at least one mobile transport unit and/or at least one further mobile transport unit.

3. The system according to claim 1, wherein
    the object transport agreement comprises at least one object delivery condition, and wherein at least a part of the first peer-to-peer network is configured to verify the fulfilment of the delivery condition such that the delivery of the object and/or a release of a function of a delivered object is only performed upon a positive verification of the delivery condition.

4. The system according to claim 3, wherein
the object is provided with at least one locking unit configured to lock at least one function of the object, and
wherein the locking unit comprises an interface configured to receive a release information causing the locking unit to unlock the function of the object.

5. The system according to claim 4, wherein
the first peer-to-peer application is configured to generate the release information upon the positive verification of the delivery condition, and
the interface is a peer-to-peer interface configured to receive the generated release information from the first peer-to-peer application.

6. The system according to claim 1, wherein the first peer-to-peer application is configured to generate a unique object transport agreement identification for each object transport agreement based at least on a private key and/or public key of the first entity and/or the further entity.

7. The system according to claim 6, wherein
the object comprises a coding unit, and
wherein the coding unit comprises at least the unique object transport agreement identification.

8. The system according to claim 1, wherein at least upon triggering by the peer-to-peer module of the first entity and/or a peer-to-peer module of the further entity, the first peer-to-peer application is configured to generate an object transaction agreement about the physical exchange of the object between the first entity and the further entity.

9. The system according to claim 1, wherein the transport broker entity is configured to provide the mobile transport unit by providing a capacity of the mobile transport unit.

10. The system according to claim 1, wherein
at least the first peer-to-peer application is a decentralized register, and
the decentralized register is readable at least by a part of the participants of the first peer-to-peer network.

11. The system according to claim 1, wherein at least the first peer-to-peer application comprises encryption means and/or signature means and/or verification means, wherein at least one of the encryption means and/or signature means and/or verification means is configured to store at least the provided object transport agreement.

12. The system according to claim 1, wherein at least the first peer-to-peer application is a block chain or decentral ledger comprising at least two blocks coupled to each other.

13. A method for operating a system, in particular, a system according to claim 1, wherein the system comprises at least one transport broker entity at least configured to provide at least one mobile transport unit, wherein the mobile transport unit is configured to transport at least one object, wherein the transport broker entity comprises a first peer-to-peer module configured to communicate with at least a first peer-to-peer application of a first peer-to-peer network, a first entity comprising a peer-to-peer module configured to communicate with at least the first peer-to-peer application of the first peer-to-peer network, the method comprising:
triggering by a first peer-to-peer module of the transport broker entity and/or the peer-to-peer module of the first entity the first peer-to-peer application such that an object transport agreement is generated about the physical transport of the object at least partly by means of the mobile transport unit between the first entity and a further entity,
wherein the transport broker entity is a transport provider entity configured to control the at least one mobile transport unit by causing the mobile transport unit to transport an object depending on the agreed conditions of the object transport agreement.

14. A locking unit of an object to be transported by using a system according to claim 1,
wherein the locking unit is configured to lock at least one function of the object, and
wherein the locking unit comprises at least one interface configured to receive a release information generated by a first peer-to-peer application of the first peer-to-peer network upon a positive verification of a delivery condition regarding the object causing the locking unit to unlock the at least one function of the object.

15. The locking unit according to claim 14, wherein
the locking unit comprises at least one processing element,
wherein the processing element comprises at least a part of the first peer-to-peer application of the first peer-to-peer network, and
wherein the processing element is configured to cause the locking unit to unlock the at least one function of the object upon a positive verification of a delivery condition generated by the first peer-to-peer application.

* * * * *